(12) United States Patent
Mair et al.

(10) Patent No.: US 8,894,327 B2
(45) Date of Patent: Nov. 25, 2014

(54) METHOD OF REELING AND UNREELING AN INTERNALLY CLAD METAL PIPELINE

(75) Inventors: John Arthur Mair, Aberdeen (GB); Thomas Schüller, Wittingen (DE); Gernold Holler, Wittingen-Knesebeck (DE); Friedrich Henneicke, Wittingen (DE); Joachim Banse, Wittingen (DE)

(73) Assignee: Subsea 7 Limited, Sutton (GB)

( * ) Notice: Subject to any disclaimer, the term of this patent is extended or adjusted under 35 U.S.C. 154(b) by 265 days.

(21) Appl. No.: 13/504,127

(22) PCT Filed: Oct. 25, 2010

(86) PCT No.: PCT/EP2010/066050
§ 371 (c)(1),
(2), (4) Date: Jul. 9, 2012

(87) PCT Pub. No.: WO2011/051218
PCT Pub. Date: May 5, 2011

(65) Prior Publication Data
US 2012/0269581 A1    Oct. 25, 2012

(30) Foreign Application Priority Data

Oct. 26, 2009 (GB) .................................. 0918768.3
Apr. 7, 2010 (GB) .................................. 1005795.8

(51) Int. Cl.
*F16L 1/20* (2006.01)
*F16L 1/16* (2006.01)

(52) U.S. Cl.
CPC *F16L 1/161* (2013.01); *F16L 1/203* (2013.01)
USPC ....................................................... 405/168.3

(58) Field of Classification Search
USPC ........ 405/154.1, 158, 166, 168.1, 168.3, 169, 405/170
See application file for complete search history.

(56) References Cited

U.S. PATENT DOCUMENTS

| | | | |
|---|---|---|---|
| 3,934,647 A | | 1/1976 | Bokenkamp |
| 5,289,845 A | * | 3/1994 | Sipos et al. .............. 137/355.27 |
| 2006/0210361 A1 | | 9/2006 | Lamison |
| 2010/0028085 A1 | * | 2/2010 | Rocher ........................ 405/169 |
| 2012/0257931 A1 | * | 10/2012 | Tkaczyk et al. ........... 405/168.3 |

FOREIGN PATENT DOCUMENTS

| | | |
|---|---|---|
| GB | 2461954 | 1/2010 |
| WO | WO 02/084160 | 10/2002 |
| WO | WO 2008/072970 | 6/2008 |

* cited by examiner

*Primary Examiner* — Benjamin Fiorello
*Assistant Examiner* — Kyle Armstrong
(74) *Attorney, Agent, or Firm* — Levy & Grandinetti

(57) ABSTRACT

A method is disclosed for reeling or unreeling a pipeline having an inner corrosion-resistant metallic liner that is tightly fitted within the pipeline. To minimize or avoid wrinkling of the liner during the reeling or unreeling, a length of the pipeline is internally pressurized in a two-stage pressurizing process, and then the length of pipeline is reeled or unreeled, as the case may be. In the first stage of the pressurizing process, the length of the pipeline is filled with fluid at an elevated pressure, and in the second stage the fluid pressure is raised to a higher pressure, which may be 25 bars or more, absolute.

24 Claims, 12 Drawing Sheets

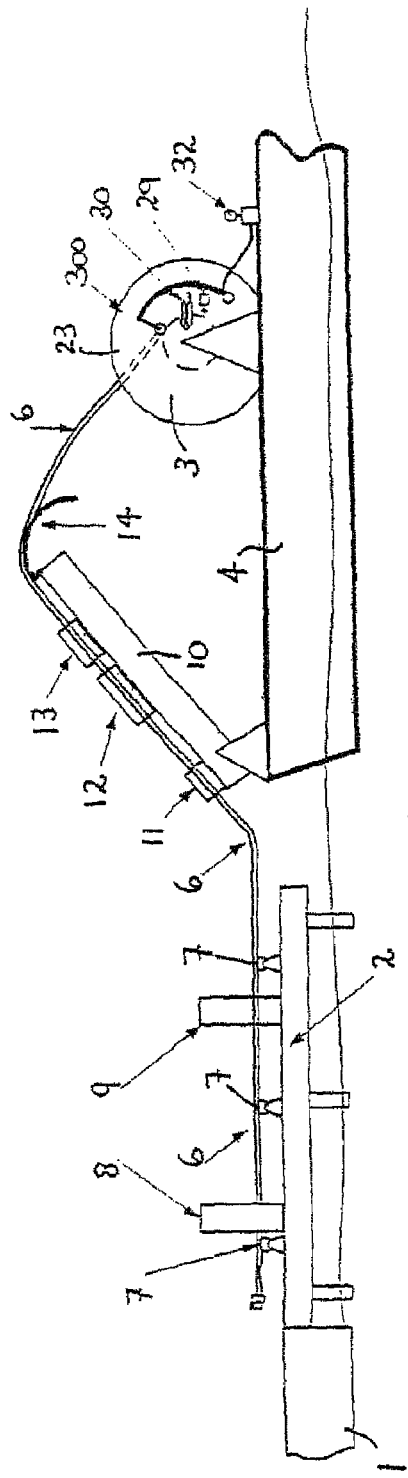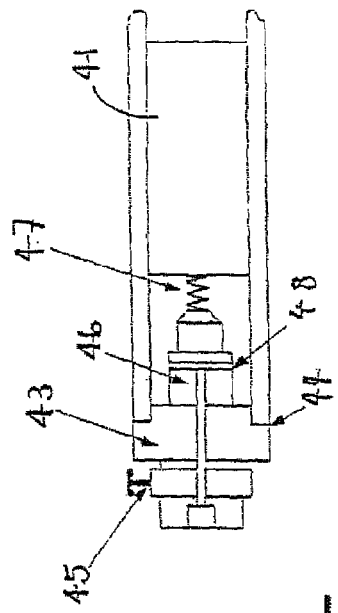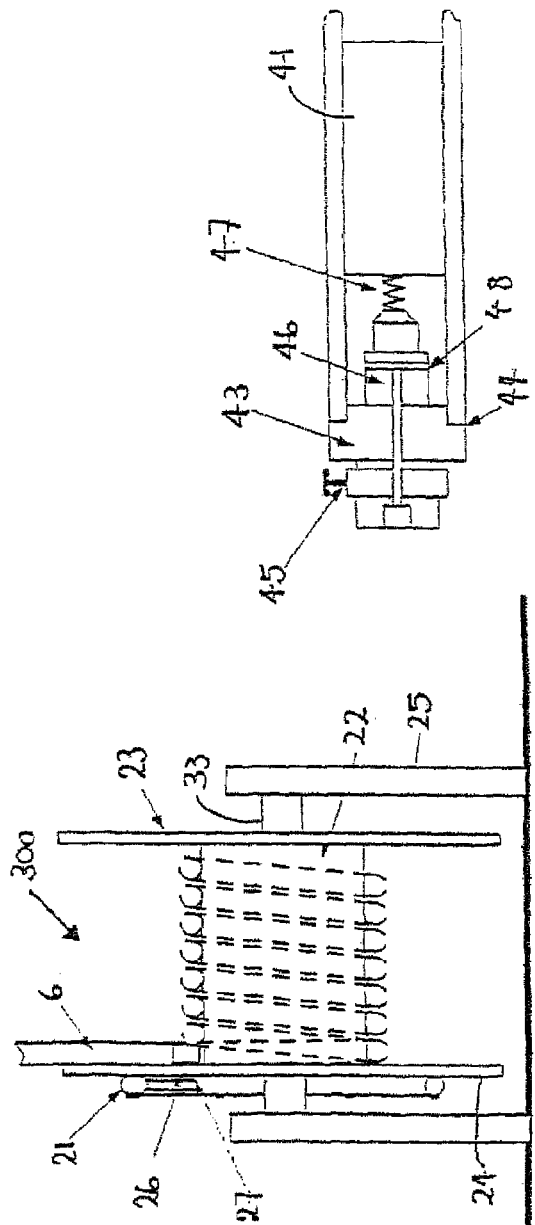

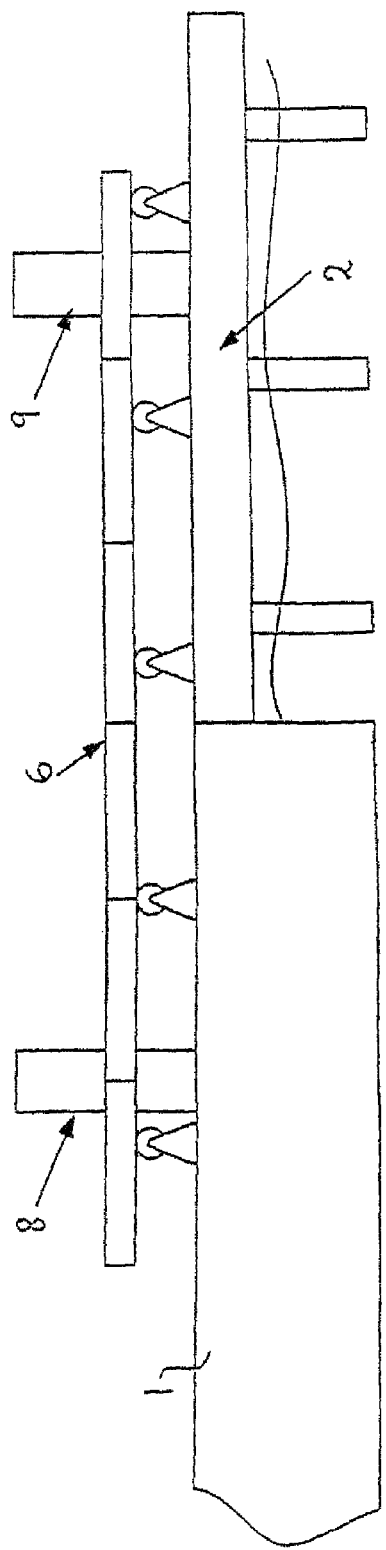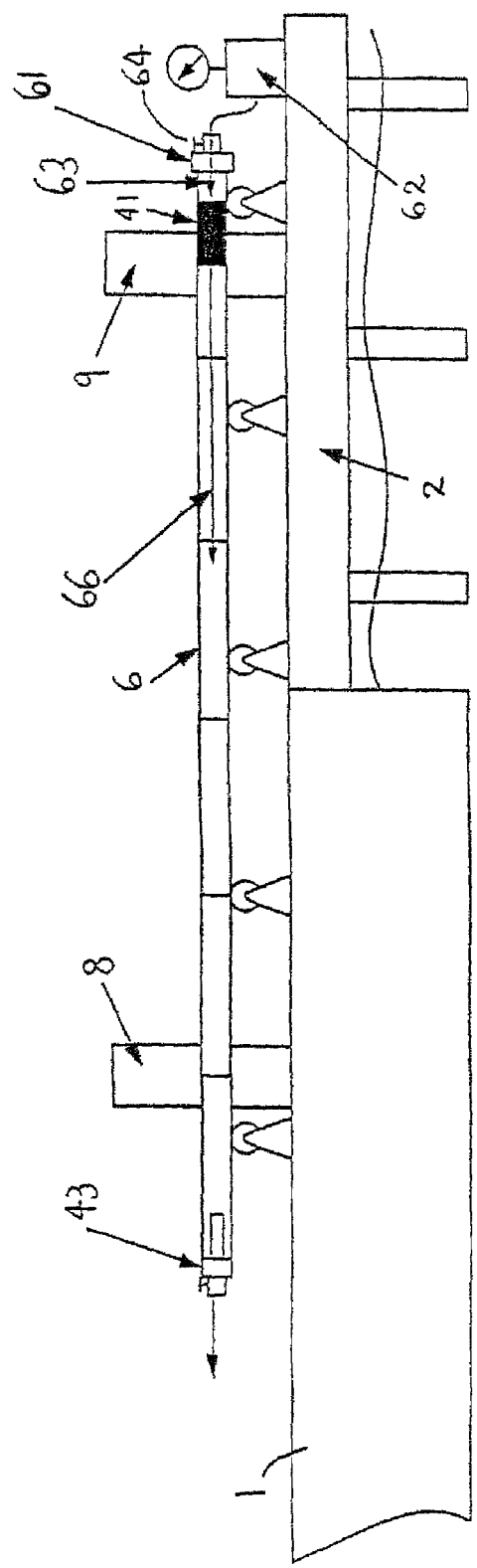

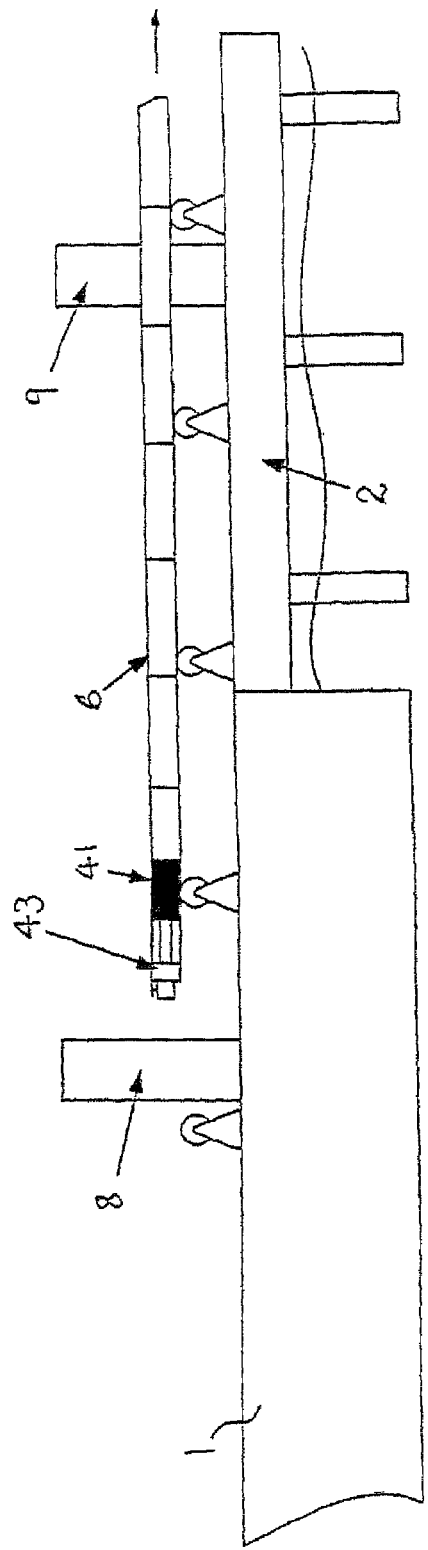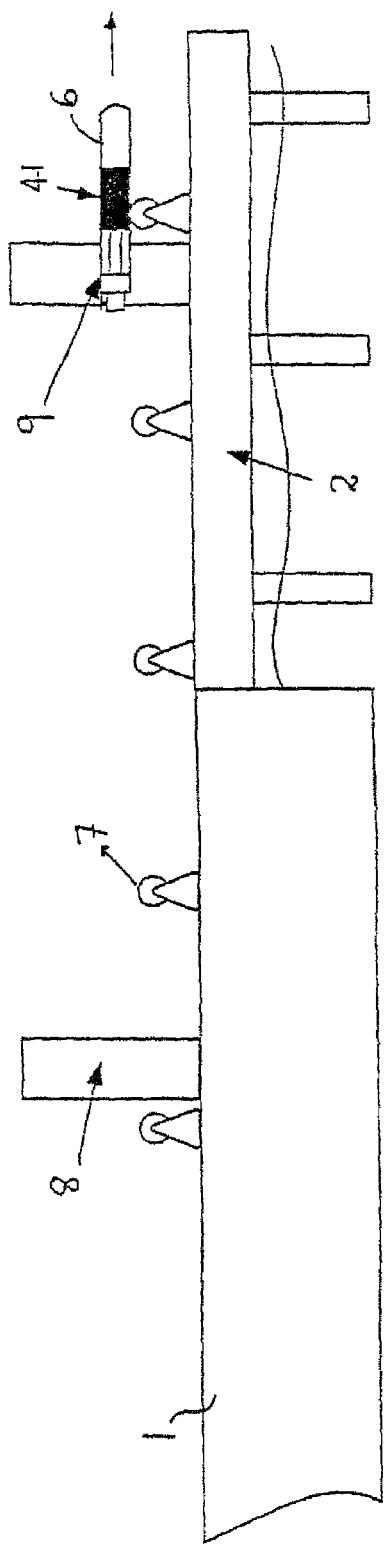
Fig. 8
Fig. 9

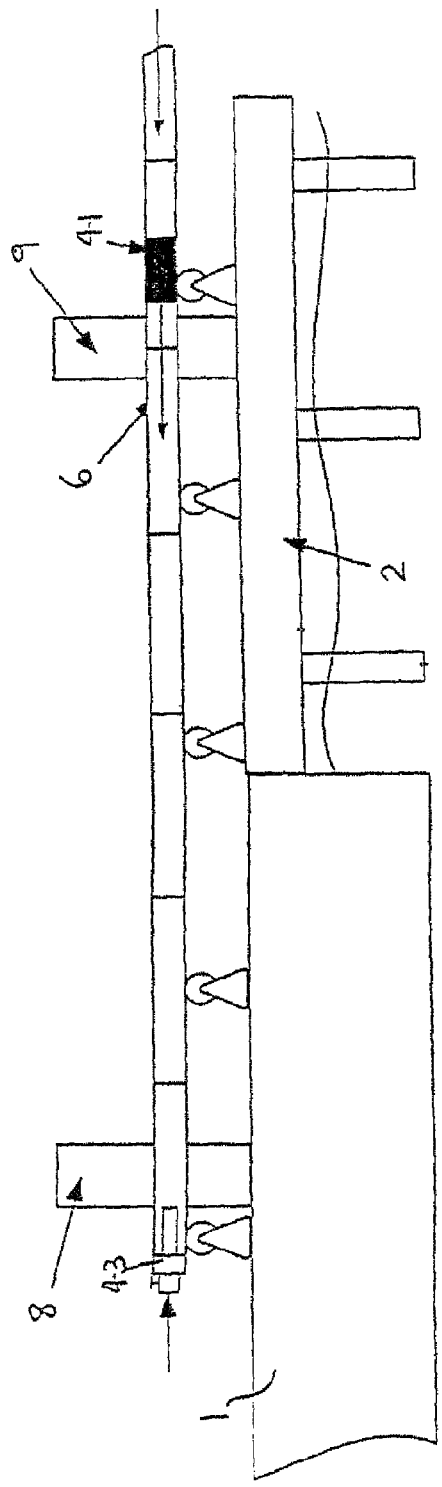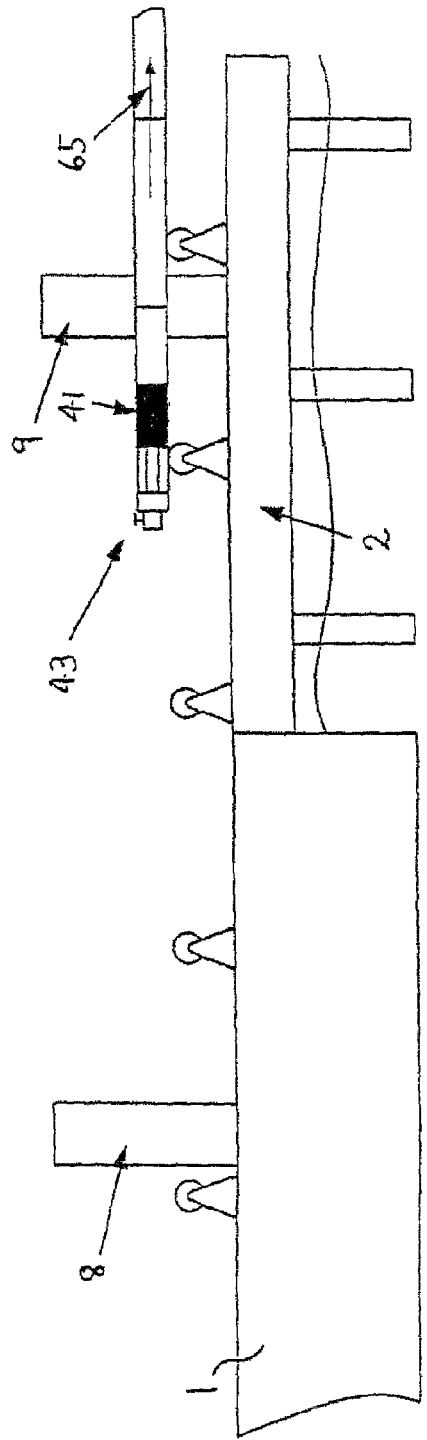
Fig. 12
Fig. 13

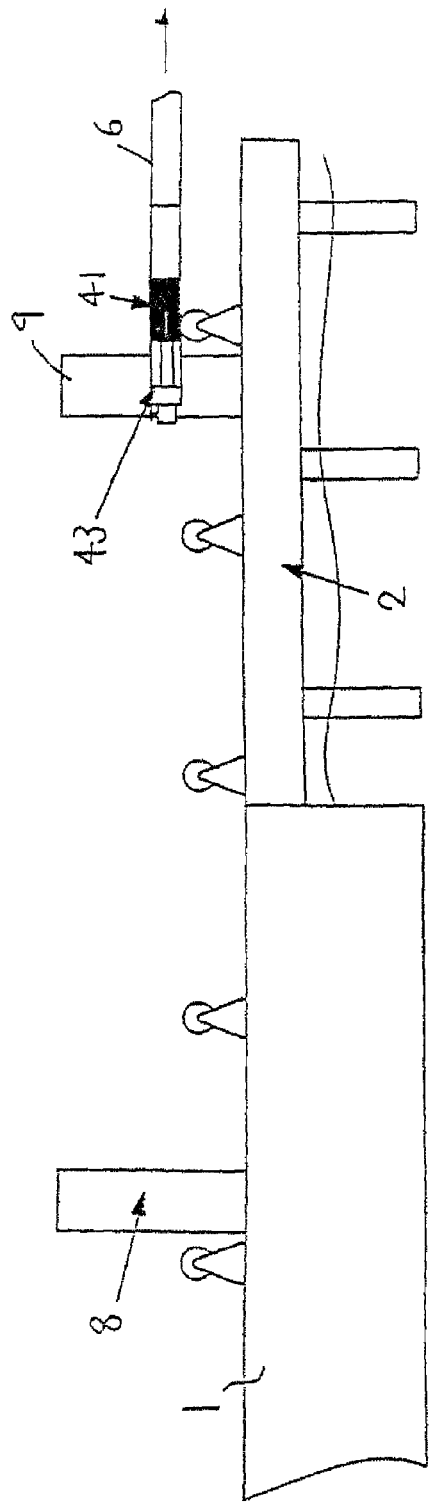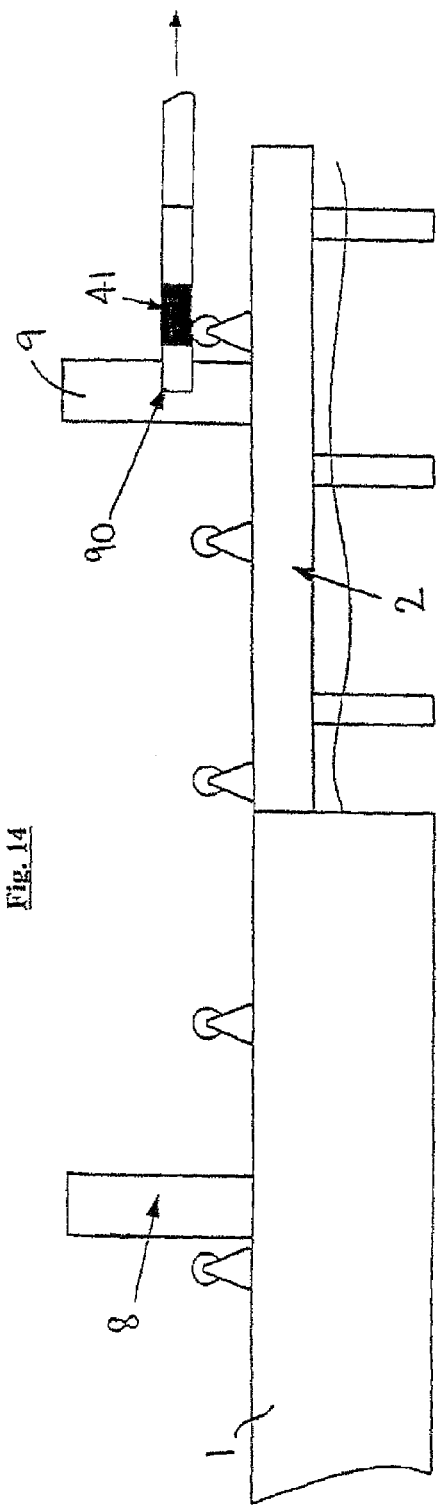

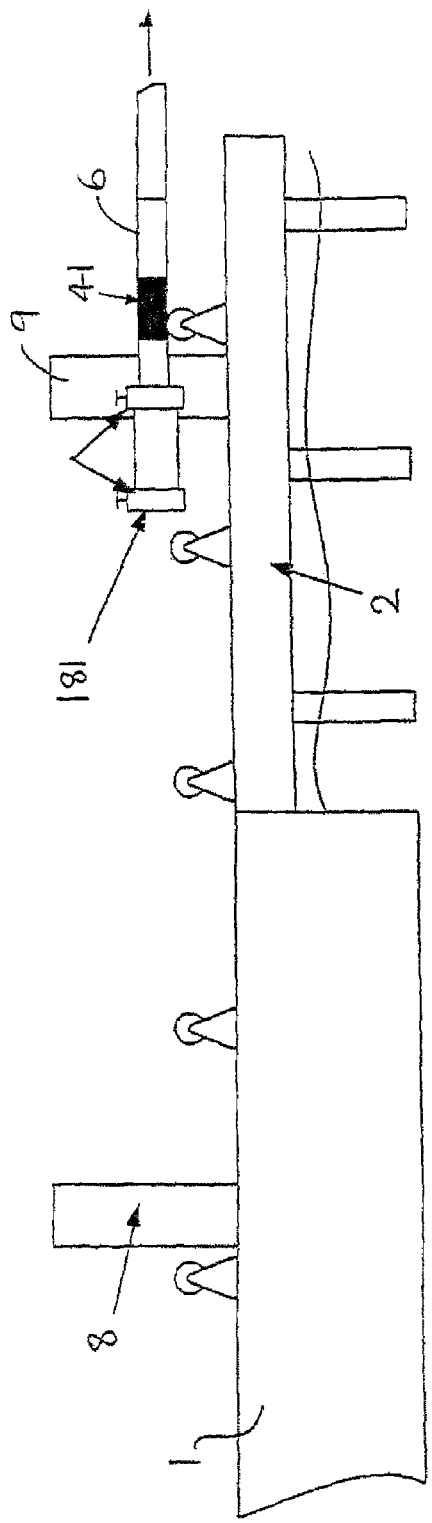
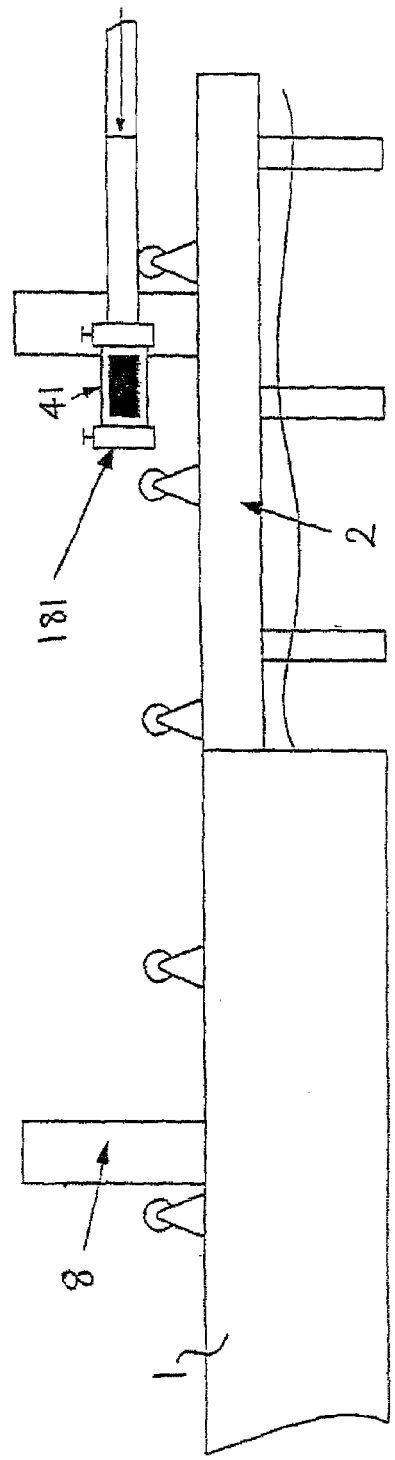

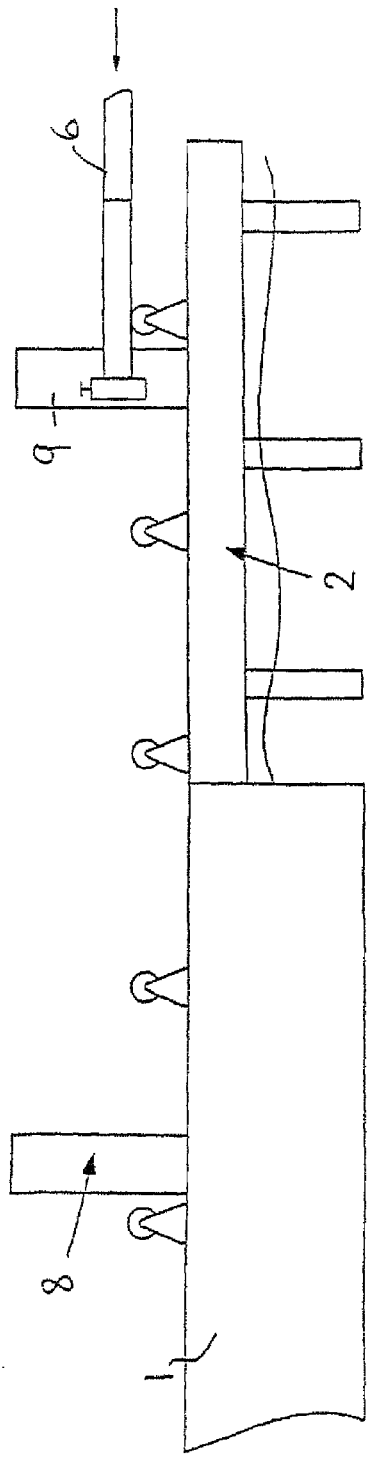
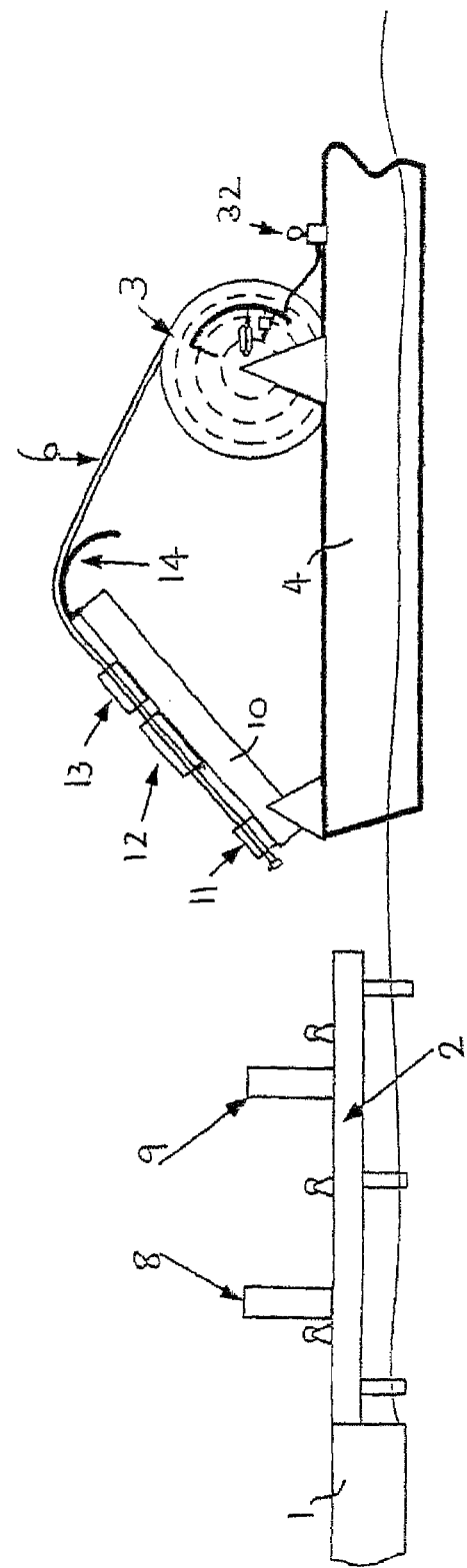

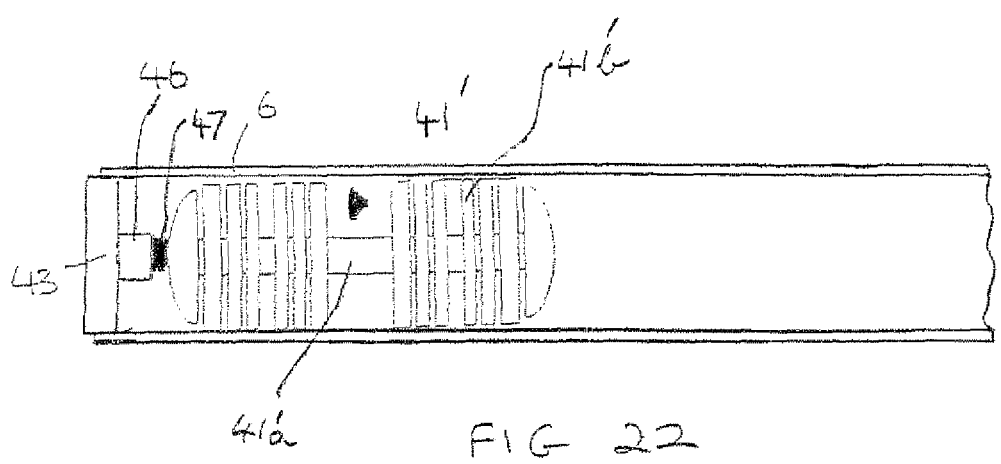

METHOD OF REELING AND UNREELING AN INTERNALLY CLAD METAL PIPELINE

This Application is the U.S. National Phase of International Application Number PCT/EP2010/066050 filed on Oct. 25, 2010, which claims priority to Great Britain Application Number 0918768.3 filed on Oct. 26, 2009, and Great Britain Application Number 1005795.8 filed on Apr. 7, 2010.

The present invention relates to methods for winding a pipeline onto a reel in preparation for pipe laying, and also to the pipe laying method.

U.S. Pat. No. 3,934,647 describes a pipe laying system including a technique for hydrostatically testing the pipeline as it is charged on a reel. When the pipe is initially started on a reel, an end section is passed through the reel hub or flange plate. The end section is attached to a full opening gate valve and a bleed valve is connected to an open nozzle. To fill the line with test water, a so-called "pig" is used, which is a device that is movable along a pipeline and can be temporarily fixed at any desired location within the pipeline. A pig is generally used to separate different fluids or gases, but it may also serve for cleaning and inspecting the inner bore of a pipeline. The pig is inserted into the open nozzle at the reel end of the pipe. A pig providing a substantially water-tight seal with the internal surfaces of the pipeline, such as a spherical pig, should be used to minimize the leakage of water past the pig. A line from a low pressure water source is then attached to the nozzle. The pig is pushed ahead of the water as the line is filled. On the other end of the line, a test head assembly has been welded. This head assembly includes bleed valves to remove any collected air and to allow the pig to be run, a full opening gate valve to allow the pig to pass out of the section to be tested, and valve connections to pressurize the line and to monitor line pressure. The pig is pumped through the line with all of the valves open except the bleed valve at the reel end until it hits the end cap. The end valve is then closed and any air is bled out of the other valves. When all the air is bled off, the gate valves are closed. The line is then pressurized through one of the small valves.

When the test is complete, the pig and water are pushed back towards the reel by air pressure applied to the end bleed valve with the gate valve at the test assembly fully open. The gate valve or the bleed valve at the reel end is used to control the flow of the test water from the pipe and to seal the pipe after the pig has moved back far enough for the test assembly to be removed.

A method for laying a pipeline onto a seabed is described in WO 2008/072970 A1. As described in that document, with an increasing need for transporting unprocessed well streams from underwater facilities and a more frequent occurrence of a need to transport aggressive fluids, there is an increased demand for corrosion-proof pipelines. However, the cost of manufacturing a pipeline entirely of corrosion-proof material has increased dramatically and therefore less expensive alternatives are required.

One such less expensive alternative is a pipeline of carbon steel with an inner corrosion-resistant cladding or liner. Such a pipeline, referred to as clad or lined pipe, combines the strength of the low-cost carbon steel with the corrosion-resistance of the liner. The liner is typically produced from a corrosion-resistant material, e.g. stainless steel, austenitic nickel-chromium-based superalloys, e.g. Inconel® or other alloy, and typically has a thickness from 1-7 mm, most typically about 3 mm.

Various ways of attaching the liner to the interior surface of the carbon steel pipeline are available. The liner may be installed either with mechanical contact, such as by plastically expanding a loosely fitting inner liner from inside, so as to elastically deform the outer carbon steel pipeline, thereby tightly fitting the inner liner within the pipeline when the expanding internal pressure is removed, or with a metallurgical bond by means of hot rolling, welding, brazing or clad welding. The least expensive alternative is to fit the inner liner mechanically tightly against the carbon steel pipeline with a so-called metallic contact, generally without any appreciable space therebetween. However, when winding such a pipeline onto a pipe laying drum or during reeling out from such a pipe laying drum, the inner liner may become deformed by buckling or wrinkling. Such deformation may locally restrict the internal bore or otherwise, affect performance, which is undesirable.

As described in WO 2008/072970 A1, this wrinkling effect can be avoided if the pipe is pressurized during reeling and/or unreeling. The application of pressure ensures that the inner liner retains close metallic contact with the outer pipe as the two are wound on or off the storage reel of a pipe lay vessel and thus undergo bending or straightening.

Such a pipeline is normally assembled from individual lengths, usually about 12 meters long, which are welded into sections which are typically 750 meters to 2000 meters long and are known as "stalks". These stalks are joined at a shore side spool base by welding at a welding station located before the vessel and the resulting pipeline is then wound onto a storage reel of a pipe lay vessel for laying offshore. The length of the stalks is limited by the length of the spool base, rather than by other technological considerations.

In outline, the method described in WO 2008/072970 A1 is as follows:

a) stalks are joined to form an initial length of pipeline for winding onto a storage reel;
b) prior to winding it onto the storage reel, the pipeline length is pressurized to a pressure between 5 and 25 bar by means of a pressurized fluid inside the pipeline length;
c) the pressurized pipe is wound onto the reel;
d) the pipeline length is depressurized and the next stalk is welded on;
e) the lengthened pipeline is then re-pressurized and wound onto the reel;
f) this process is repeated until the required length of pipeline has been stored on the reel;
g) the pipe lay vessel then proceeds to the worksite;
h) the pipe is re-pressurized and this pressure maintained as the pipe is unwound from the reel and laid onto the seabed in the conventional manner; and
i) once successfully laid on the seabed, the pipe is depressurized.

According to WO 2008/072970 A1, during winding and unwinding, the pressure must be maintained between 5 and 25 bars absolute pressure. A pressure lower than 5 bar fails to remove the risk of deformation such as buckling or wrinkling, whilst a pressure higher than 25 bar would be impractical and create problems. The document does not elaborate on what is meant by "impractical" or what "problems" may be created. However, it is thought that this is a reference to the fact that, if water is used as the pressurizing medium, a high delivery pump would be needed to fill the space within the pipe sufficiently quickly prior to pressurization, but such a pump may only be capable of achieving a pressure less than 25 bar. On the other hand, if air were to be used, a practical pressure limit of 25 bar would arise due to the risk of rapid expansion and release of large quantities of stored energy in the event of possible failure of the pipe, which could compromise safety. Moreover, whichever type of pressurized medium is used, pressures greater than about 25 bar within the spooled pipe would tend to straighten it and might cause it to spring outwardly from the storage drum, unless special measures were taken to prevent this, such as the application of sufficient back tension.

WO 2008/072970 A1 also does not elaborate on how the pipe is to be pressurized.

According to a first aspect of the invention, there is provided a method for reeling or unreeling a pipeline having an inner corrosion-resistant metallic liner that is tightly fitted within the pipeline, wherein, to minimise or avoid wrinkling of the liner during the reeling or unreeling, the following steps are performed: internally pressurising a length of the pipeline in a two-stage pressurising process, in the first stage of which the said length of the pipeline is filled with fluid at an elevated pressure and in the second stage of which the fluid pressure is raised to a higher pressure; and reeling or unreeling, as the case may be, the said length of the pipeline while pressurised.

Pumps that are capable of filling the pipeline with fluid at elevated pressure need to have high volumetric delivery, in order to fill the pipe in an acceptably short period of time (for example about half an hour), but they would not normally be able alone to internally pressurise the pipeline to a pressure exceeding 25 bar absolute. However, the pressure can readily be raised above 25 bar absolute if a separate, lower volumetric delivery but higher delivery pressure, pump, or a high pressure accumulator is used. By raising the fluid pressure to which the fluid is pressurised above the delivery pressure of the high volumetric delivery pump, the likelihood of minimising or avoiding wrinkling of the liner can be increased.

An example of a suitable high delivery pump to fill the pipeline is a centrifugal pump. In one implementation, this pump can be a containerised centrifugal pump driven by a diesel engine.

An example of a suitable higher delivery pressure pump is a reciprocating piston pump. In one implementation, this pump can be a skid mounted reciprocating piston pump driven by compressed air. Alternatively, a single high pressure accumulator or a bank of high pressure accumulators may be used instead.

According to a preferred implementation, the higher pressure is more than 25 bar absolute and a multi-stage pump is used to internally pressurise the length of pipeline to said higher pressure.

Multi-stage pumps are readily available that provide adequate volumetric delivery to fill the length of the pipe in an acceptably short time duration, when using water as the pressurising fluid, while also raising the water pressure above 25 bar absolute, or more, if needed.

Suitably, the multi-stage pump may be a centrifugal pump. For example, the multi-stage pump may be a singular multi-stage diesel driven centrifugal pump, which typically would achieve the required delivery pressures, every 35 bar absolute or more, if necessary.

In one implementation of the method for winding a pipeline onto a reel, the pipeline having an inner corrosion-resistant metallic liner that is tightly fitted within an outer pipe which is less corrosion-resistant, the method comprises the operations of:
  pumping a movable plug along a length of pipeline towards a trailing end so that the length of pipeline is filled with fluid;
  locking the movable plug near the trailing end of the length of pipeline;
  pressurizing the fluid to an absolute pressure of at least 25 bar using the two-stage pressurising process;
  winding said pipeline onto a reel whilst said absolute pressure of at least 25 bar is maintained within the pipeline;
  depressurizing said pipeline; and
  joining a further pipeline section to the trailing end followed by repetition of the pumping, locking, pressurizing and winding operations.

When pressurizing the pipeline with water, or any other substantially incompressible fluid, the use of a moveable plug has the significant advantage that it is unnecessary to fill and drain the entire length of pipeline each time a further pipeline section is attached. This has important benefits in terms of time-saving, since the process of filling and draining and drying the end of the pipeline for welding would be very time-consuming.

According to a second aspect of the invention, there is provided a method of pipe laying in which a pipeline is unreeled from a pipe laying reel on a pipe lay barge, the pipeline having an inner corrosion-resistant metallic liner closely fitted within an outer pipe that is less corrosion-resistant, comprising the operations of: pressurizing the pipeline by raising the pressure of an internal fluid filling the pipeline to an absolute pressure of at least 25 bar; unwinding said pipeline from the reel whilst said absolute pressure of at least 25 bar is maintained in the pipeline; laying the pipeline on the seabed; and depressurizing the pipeline.

For a better understanding of the invention, and to show how the same may be carried into effect, reference will now be made, by way of example, to the accompanying drawings, in which:

FIG. 1 illustrates a pipe loading method according to one embodiment of the invention;

FIG. 4 illustrates a trailing end cap and pig;

FIG. 5 shows an initial pipeline length;

FIG. 6 shows an initial pipeline length together with a pig pumping setup;

FIG. 8 shows a pressurized pipeline length loaded to a reel connection point;

FIG. 9 shows a pressurized pipeline length loaded onto a reel;

FIG. 12 shows a pipe length ready for pig pumping and pressurizing;

FIG. 13 shows an additional length of pressurized pipeline being wound onto a reel;

FIG. 14 shows a pressurized pipeline length closed by an end cap and wound onto a reel;

FIG. 15 shows the pressurized pipeline length with the end cap removed;

FIG. 16 shows an installed pig catcher at the trailing end;

FIG. 17 shows the pig pumped into the catcher of FIG. 16;

FIG. 18 shows the pig catcher removed and the pipe pressurized; and

FIG. 19 shows the reel fully loaded;

FIG. 20 shows a variant of the pipe loading method;

Figure 21A:
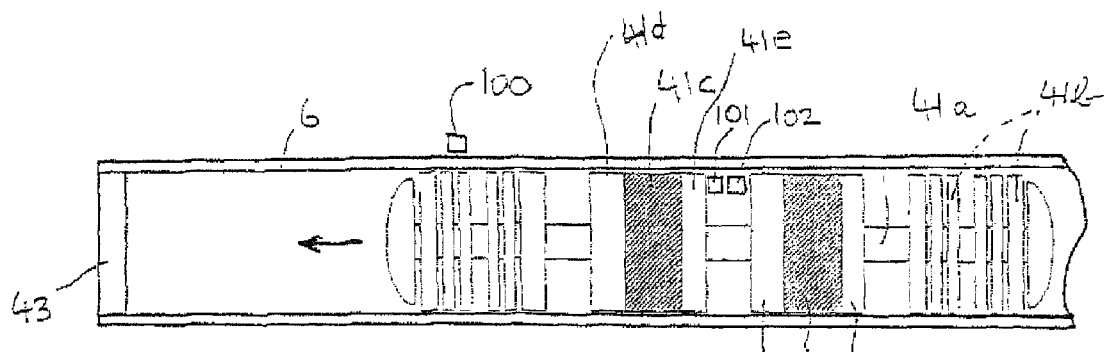
Figure 21B:
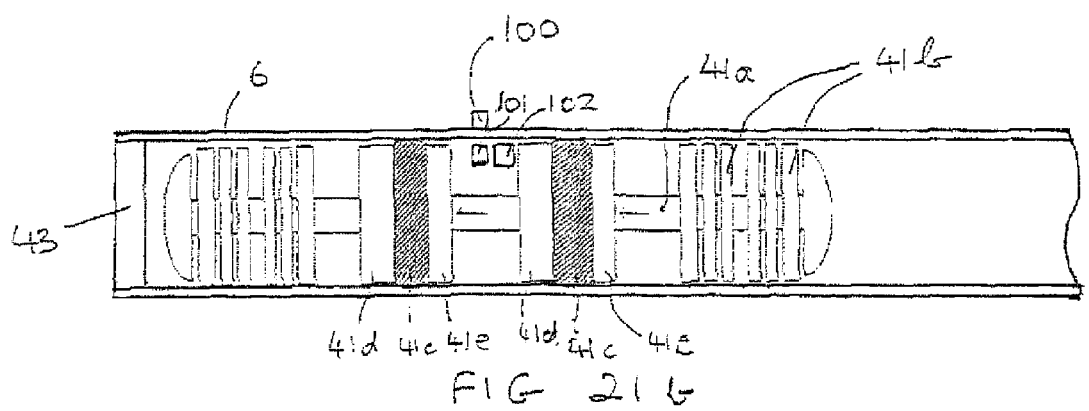

FIG. 21*a* shows a side view of a preferred form of pig, when it is being moved within the pipeline;

FIG. 21*b* is a corresponding view, showing the pig when locked in position at the end of the pipeline; and FIG. 22 is a part-sectional, side view of a friction pig, which is an alternative form of pig to the smart pig shown in FIGS. 21a and 21b.

FIG. 1 shows a pipeline loading arrangement in which pipe sections or stalks of lined pipe are assembled at a shore based pipeline making facility 1 and passed over a loading jetty 2 to a storage reel assembly 300 on a pipe lay vessel 4. The shore based pipe making facility 1 is sometimes known in the industry as a spool base. As shown in FIG. 1, a length of pipeline 6 passes over a series of support rollers 7 through first and second pipe joint welding and coating stations 8 and 9, which are also provided with testing and inspection capabilities to test for weld quality.

The pipeline 6 passes along a ramp 10, which supports a hold off clamp (HOC) 11, a tensioner 12 and a straightener 13, and then over a chute/guide 14 before arriving at the storage reel assembly 300, having a storage reel 3.

In the following discussion, the end of the pipeline which is initially fed onto the storage reel 3 is referred to as the leading end of the pipeline and the other end is referred to as the trailing end.

By using the equipment illustrated in FIG. 1, lined pipe stalks are joined together in the spool base 1 to form a length of pipeline 6 which can be wound onto the storage reel 3 on the vessel 4.

As described in more detail in the following, the basic steps in the winding process are as follows: an initial length of pipeline 6 is assembled by welding together a succession of pipe stalks. The pipeline is then pressurized with water to a required absolute pressure, being preferably at least 30 bar before being advanced up the ramp 10 over the chute 14 and onto the reel 3. After winding onto the storage reel 3, the pipe is depressurized, another length added, pressurized with water, and further advanced onto the reel 3. This process is repeated until reel 3 is full and the vessel 4 can then be transferred to the worksite. At this point, the pipe is re-pressurized and then laid on the seabed in the conventional manner.

In view of the relatively high level of pressurization employed in the pipeline, it is important to ensure that, when pressurized on the reel, the pipeline is securely held at the free end and that sufficient winding tension is maintained on the reel, in order to resist the tendency of the pipeline to straighten.

The level of pressurization during the winding process is important to success. The lowest value of the pressurisation range must be sufficient to prevent wrinkling of the liner. In practice, a minimum value of 5 bars absolute is appropriate. Whilst the pressure should be as high as possible to avoid or minimize wrinkling of the liner, an upper limit is in practice provided by the need to maintain structural integrity of the pipeline. For most cases, an upper limit of 50 bar absolute is prudent and an upper value of below 25 bars absolute will ordinarily be adequate to maintain structural pipeline integrity, especially if it is close to 25 bars. However, higher pressures may be used, depending on the fracture value for the pipe concerned, which can vary significantly from pipe to pipe and may in some cases be a very high number, e.g. 800 bar or more.

Accordingly, a preferred pressurization range is defined by a lower absolute value of 5 bar and an upper absolute value that is less than 25 bar. Preferably the upper value is less than 24.95 bar, more preferably 24.9 bar, still more preferably 24.49 bar, even more preferably to 24.45 bar, even more preferably still 24 bar.

The lower value (absolute) of the pressurization range is preferably 5.5 bar, more preferably 6 bar, even more preferably 6.5 bar and even more preferably still 10 bar.

The pressurization range may be defined by any combination of lower and upper stated values, as specified herein.

The pressurization of the pipeline during the reeling process is achieved by driving a pig towards the trailing end of the pipeline, so that the pipeline becomes filled with water. The pig may be a smart pig and is in any event sized to be driven through the pipe by water pressure applied behind it. This pig is equipped with seals and a remotely-operated locking mechanism such that it can be used to form a watertight bulkhead near the trailing end of the pipeline. The locking and sealing arrangement permits the trailing end cap to be removed, whilst the pig, and the water behind it, are retained in place for the stalk joining operation. This means that draining of the pipeline is unnecessary. The pig sealing/locking arrangements are important, as the end of the pipe has to be kept dry so as not to compromise the stalk to stalk joining (i.e. welding) operation.

It is preferred to pressurize the pipeline with water, as it is substantially incompressible and readily available on site. However, it would also be possible to employ other fluids such as air or nitrogen.

Figure 2A:
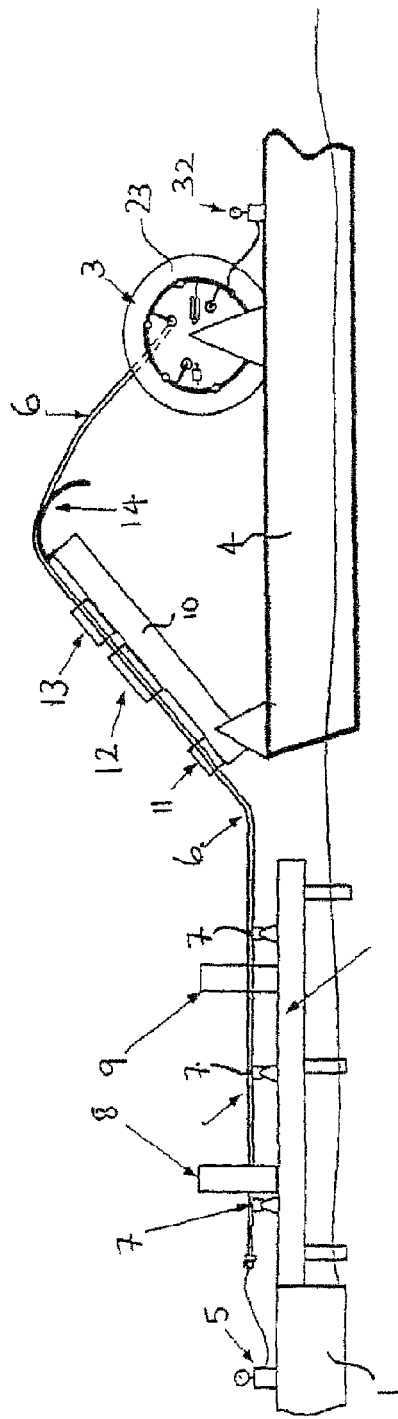
FIG. 2 is an end view of a pipe winding reel.
Figure 3:
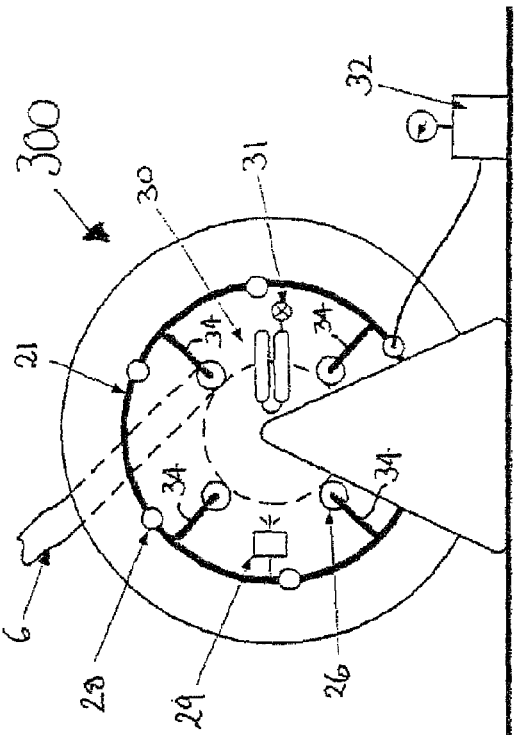
FIG. 3 is a side view of a pipe winding reel.

FIGS. 2 and 3 illustrate the reel assembly 300 in more detail.

The rotatable reel 3 of the reel assembly 300 is mounted on bearings 33 which are supported by a support structure 25. The reel 3 comprises a hub 22, onto which the pipeline 6 is wound, and two end flanges 23 and 24. Flange 24 carries a ring manifold 21 which, in one embodiment, provides a series of six valved pump connections 28 arranged annularly around the manifold 21. Each pump connection has a respective non-return valve. Radially inwards of the manifold 21 are provided four flange openings 26 through which pass respective pipe-to-manifold connectors 27 which are coupled to the manifold 21 by respective radially extending conduits 34. The provision of multiple valved connections ensures that one connection is always accessible for connection of a pressurizing pump regardless of the reel position. The leading end of the pipeline 6 is configured for connection to one of the pipe-to-manifold connectors 27. Alternatively (and less preferably) the pipe end connection could be made through an opening in the reel hub, and thence to a similarly equipped manifold within the hub (not shown). A pump 32 is coupled to any selected one of the pump connectors 28. Also connected to the manifold 21 is an accumulator 30, and a wireless pressure monitoring unit 29.

Pump 32 represents a pumping system which incorporates a high capacity pump to deliver a flow rate capable of filling the pipe within a reasonable timescale. In addition, when the pressure in the pipe is to be raised to a final absolute value of at least 25 bar, the high capacity pump may optionally be augmented by a high pressure pump or accumulator to make up the difference between the pressure capability of the high volume pump which is generally in the order of 10 bar and the desired pipeline pressure. Alternatively, when the pipe internal pressure is increased to a final absolute value in the range 5 bar to less than 25 bar, the high capacity pump may optionally be augmented by an accumulator. In each case, the accumulator 30 is pre-charged to the required pipe pressure. This to ensure that the pressure can be maintained at the required level when the pump is disconnected during reeling/unreeling operations, which may affect pipe volume. (As the pipe is wholly water filled, relatively small changes in volume can lead to significant changes in pressure.) The accumulator 30 will compensate for both increased and decreased pressure and is fitted with a shut-off valve 31 so that it can be isolated from/connected to the manifold 21 as necessary. A pressure monitor 29 is connected to the manifold arrangement 21 so that the pressure in the pipe can be monitored after the pump 32 is disconnected prior to reel rotation for loading/laying of pipe. To cater for reel rotation, the pressure monitor may be of wireless transmitting type.

FIG. 4 shows the trailing end of a pipe section containing a pig 41. At the left-hand end of the pipe section is provided a trailing end cap 43 connected to the pipe via a seal 44. The trailing end cap 43 is provided with an isolating valve 45 designed to seal the pipe end up to the full working pressure. Valve 45 also provides an air vent and a means for checking the conditions in the pipeline 6 between the pig 41 and the end cap 43. On its internal side, the end cap 43 has a stand-off 46 having a buffer spring 47, which stops the pig 41 short of the trailing end. An internal passage 48 allows air to be vented through the end cap 43 when the isolating valve 45 is open. The stand-off distance is such that one stalk can be welded to another without damaging the pig (i.e. far enough from the heat affected zone so that the pig sealing and locking capabilities are not compromised).

Figure 7:
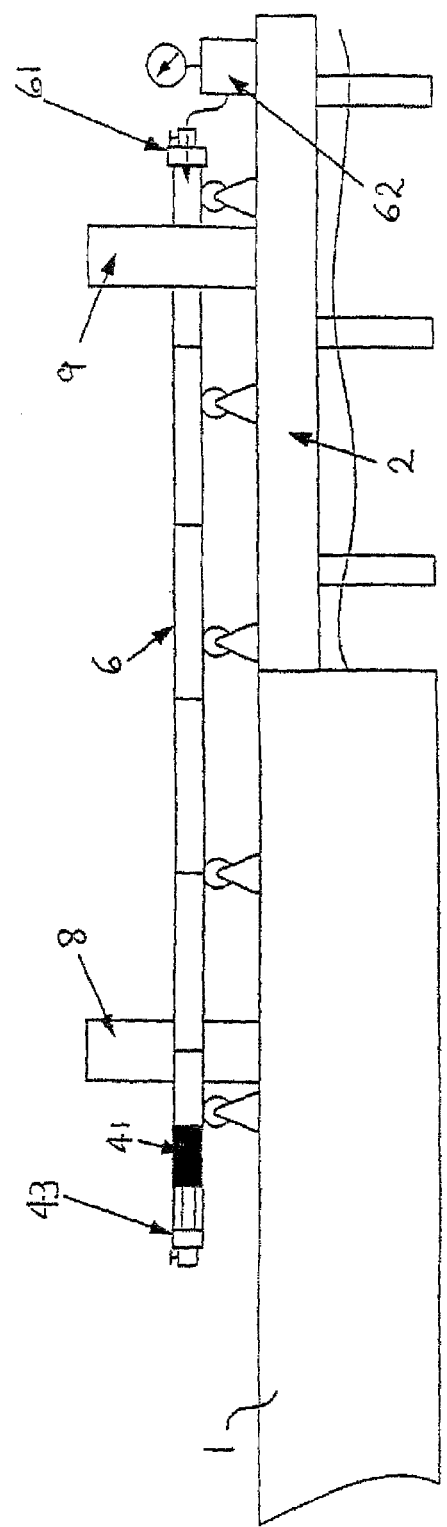
FIG. 7 shows a pipeline length having a pig pumped to the trailing end and the pipe pressurized.

Having established an initial pipeline length 6 from a plurality of pipe sections by welding and coating a number of stalks as shown in FIG. 5, the pig 41 is inserted into the pipeline 6 at the leading end, which is then closed by a leading end cap 61 as shown in FIG. 6. The leading end cap 61 is also provided with an isolating valve 64, and is designed to seal the pipe up to full working pressure. The high capacity pump of a pumping station 62 is then operated to pump water through the leading end cap 61 to create a water flow 63 to advance the pig 41 along the pipeline 6 in the direction of movement 66 until it reaches the spring 47 of stand-off 46 on the trailing end cap 43, as shown in FIG. 7. During this process, the isolating valve 45 on the trailing end cap 43 is open to allow air ahead of the pig 41 to vent out through the internal passage 48. This ensures a water filled (i.e. virtually air free) pipeline length for the subsequent pressurizing process. If required, the progress of the pig 41 along the pipe can be determined from the volume of water pumped in, and/or via an onboard acoustic signal. When the pig 41 reaches the stand off 46 at the trailing end cap 43, near to the trailing end of the pipe (for example about or substantially 2 meters away), the pig 41 is locked in position by the remotely actuated on-board hydraulics. If required, the high capacity pump is then replaced by a high pressure pump or accumulator which pressurizes the pipeline to the required pressure, preferably above 25 bar and for example in the range of 30 bar to 50 bar. Alternatively, for elevated pressures in the range defined by a lower value of 5 bar absolute and an upper value that is below 25 bar absolute, after the pig 41 is locked in position by the remotely actuated on-board hydraulics, the high capacity pump then raises the water pressure to the required elevated pressure. However, if required, the high capacity pump can be replaced by a high pressure pump or accumulator which pressurizes the pipeline to the required pressure, to prevent or minimise wrinkling of the liner when the pipeline is wound onto the reel 3. In each case, once the desired elevated absolute pressure is reached, the trailing end cap isolating valves 45 are then closed and the pumping station 62 disconnected as illustrated in FIG. 8, in preparation for reeling.

With the pipe lay vessel 4 moored to the pipe loading jetty 2, the leading end of the pipeline 6 is then fed up through the hold-off clamp 11 of the pipe lay system as shown in FIG. 1. The pipe runs up the ramp 10 through the tensioner 12 and the straightener 13 and thence over the chute 14 at the ramp top and down to the reel 3. Here it is connected to the pressurizing ring manifold 21 of the reel 3.

Alternatively, the leading end of pipeline 6 can by-pass the hold-off clamp 11, tensioner 12 and straightener 13 on ramp 10, and be fed directly to the powered reel 3. In this way, the number of bending cycles to which the pipe is subjected can be reduced, which increases the service fatigue life of the pipe as less of it is consumed during the reeling and installation process.

The reel mounted accumulator 30 pre-charge pressure is then checked, adjusted if necessary, and its shut-off valve 31 opened to connect it to the manifold 21.

Figure 10:
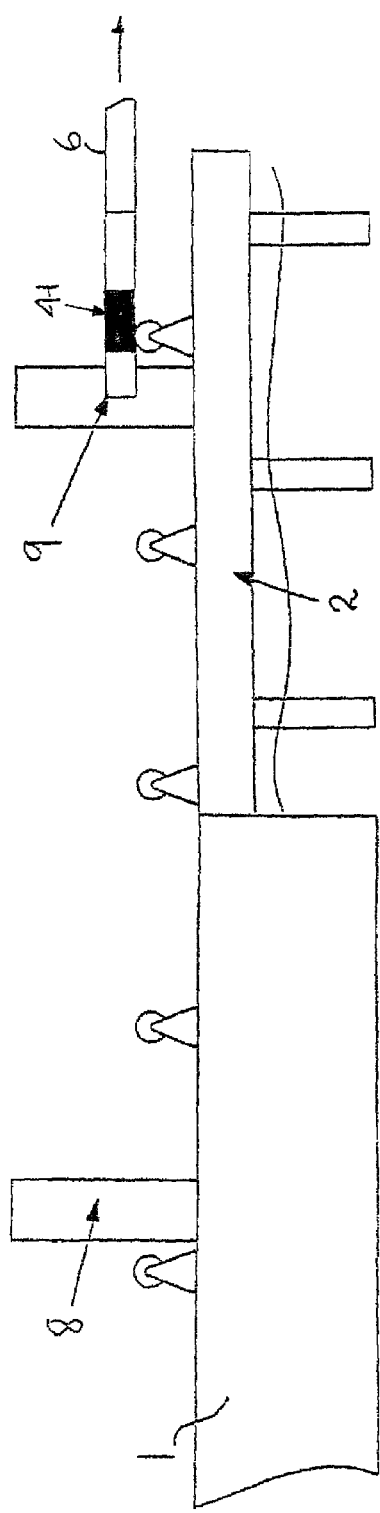
FIG. 10 shows a trailing end cap removed for joining of a next stalk.
Figure 11:
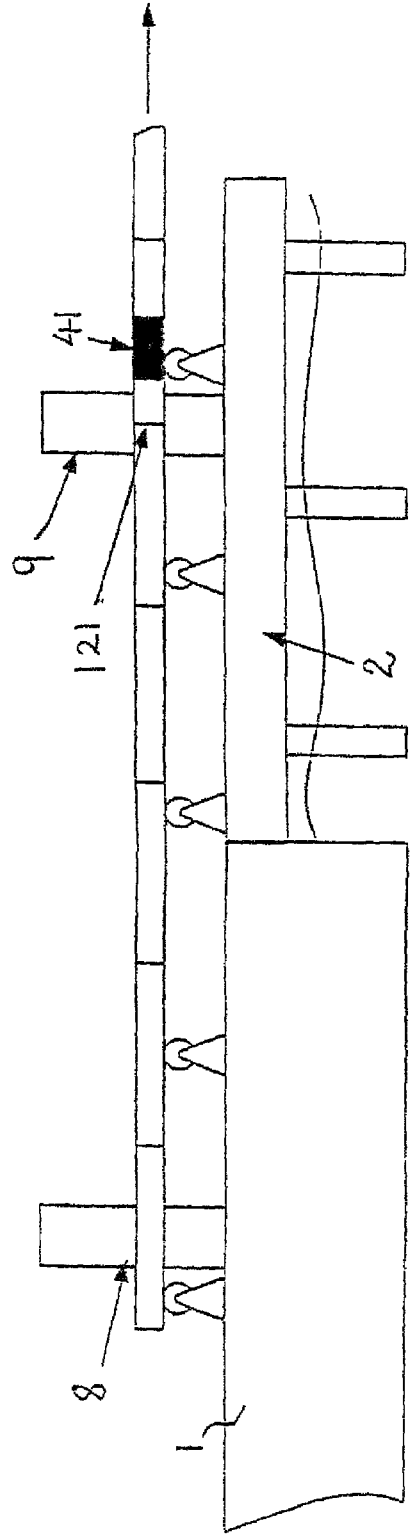
FIG. 11 shows a new stalk joined to the pipeline training end.

The pressurized pipeline length 6 is then wound onto the vessel reel 3 until its trailing end reaches the jetty end onshore welding/coating station 9, as shown in FIG. 9. The pipe 6 is then gripped in the vessel hold-off clamp 11. After isolating the accumulator, the pipe 6 is depressurized, the trailing end cap 43 is removed as shown in FIG. 10, and the next stalk is then held and welded on to the pipeline length. The new joint 121 is then NOT tested and coated as schematically illustrated in FIG. 11.

Referring now to FIG. 12, the trailing end cap 43 is fitted to the new stalk end, and the pig 41 is released by operating the remotely actuated onboard hydraulics. After connecting the high capacity pump 32 to the manifold 21, the pig 41 is pumped up against the trailing end cap stand-off 46, as illustrated in FIG. 13.

As before, the pig 41 is then locked in position, and if required the high capacity pump 32 replaced by a high pressure pump and the pipe 6 then re-pressurized to the correct elevated level in the range defined by the lower value of 5 bar absolute and the upper value that is less than 25 bar absolute or in the range having the lower limit of at least 25 bar absolute, e.g. 30-50 bar, as the case may be. The pumping station 32 is then isolated and disconnected from the reel 3 and the accumulator 30 reconnected to maintain the pressure in the pipe during the reeling process. A length of pipe equal in length to the newly attached stalk is then wound onto the reel 3 so that the pipeline 6 moves in the direction of arrow 65 until the trailing end is again at the welding/coating station 9 as shown in FIG. 14. The pipe 6 is again gripped in the hold-off connector 11 and the process repeated until the required amount of pipe—except for the final stalk—has been stored on the reel 3. The trailing end cap 43 is then removed (FIG. 15) and a pig catcher 181 fitted to the pipe end 90, as illustrated in FIG. 16. The pig 41 is then released, pumped into the catcher 181 (FIG. 17) and removed. In the condition shown in FIG. 18, the pipeline 6 is then pressurized to the correct reeling pressure. The final stalk is then wound onto the reel 3 as shown in FIG. 19, and the pipeline then depressurized.

A variant of the method illustrated and described with reference to FIGS. 1 to 19 will now be described with reference to FIG. 20. As before, a number of stalks are welded together and coated to form an initial pipeline length, typically 750-1,500 meters long, for winding onto the storage reel 3. A pig similar to pig 41, but including an internal passage closed by a poppet valve, is inserted into the leading end of the pipeline, the leading end cap 61 is fitted and connected to a high capacity pressurizing pump 62, substantially as illustrated in FIG. 6. At the trailing end of the pipeline 6, the end cap 43, with a stand-off 46, is installed. However, the stand-off 46 includes an operating probe for opening the poppet valve. The isolating valve 45 in the trailing end cap 43 is opened to allow air ahead of the pig to be vented. The low pressure pump 62 is then used to push the pig through the pipe 6 until it bears against the stand-off 46, as indicated by a pressure rise in the pipe and the poppet valve is opened. As before, this ensures a water-filled and virtually air-free pipeline length for the subsequent pressurizing process. If required, the progress of the pig along the pipe 6 can be determined from the volume of water pumped in and/or by means of an onboard acoustic signal.

The pig is then locked in position by operating the remotely actuated onboard hydraulics. The shut-off valve in the leading end cap 61 is then closed. The high-pressure pump or accumulator is then connected to the trailing end cap 43 and employed to pressurize the pipeline to the required elevated pressure, that is to say within the range defined by the lower value of 5 bar absolute and an upper value that is below 25 bar absolute, or in a range having the lower limit of at least 25 bar absolute, e.g. 30 to 50 bar, as the case may be. In this process the pressure is applied through the end cap 43 and the passage through the pig 41, whilst its poppet valve is held open by the operating probe on the stand-off 46.

Once the pipeline has reached the desired pressure, the valve 64 in the trailing end cap 43 is shut and the high pressure pump or accumulator disconnected.

Further lengths of pipe can then be added as required substantially as shown in FIGS. 10, 11, 12 and 13, except that the pressurizing operation is performed as described above with the high-pressure pump or accumulator applying the high pressure through the internal passage in the pig 41.

Once the pipe has been wound onto the reel 3, the pipe lay vessel 4 will then sail to the required off-shore worksite.

Once the vessel has reached the worksite, the pipe internal pressure can be checked and adjusted as necessary. With the accumulator 30 connected to maintain the required pressure level, the pipe 6 is then unreeled down the ramp 10 and onto the seabed in the conventional manner until the pipeline 6 has been successfully laid. Finally, the pipeline is depressurized.

FIGS. 21*a*, 21*b* show a side view of a preferred form for the pig 41 of the preceding embodiments. The pig is preferably a smart pig comprising a central elongate body 41*a*, on each end of which is mounted an assembly of closely spaced disc seals 41*b*. These seals can be in the form of polyurethane discs. These discs act to guide the pig through the pipe and also serve to limit the amount of water which leaks past the pig during the pipeline filling operation, to ensure the pig is efficiently displaced through the pipeline.

In addition, a pair of engagement devices is located on a central portion of the elongate body 41*a*. Each such seal comprises a squashable locking disc 41*c* sandwiched between a fixed plate 41*d* and a movable plate 41*e*. When the movable plate 41*e* is displaced towards the fixed plate 41*d*, the locking disc 41*c* is flattened, which causes its outer circumferential surface to bulge outwardly and engage tightly with the inner wall surface of the pipeline, thereby locking the pig in position and providing a fluid-tight seal.

In operation, the isolation pig is driven through the pipeline using water pressure applied at one end (the right hand end in FIGS. 21*a*, 21*b*). A transmitter receiver collar 100 is attached around the pipeline at a location adjacent to the end cap where the pipe is to be locked in position. Once the pig has reached this location, a battery powered receiver 101 on board the pig detects a magnetic pulse signal from the collar 100 fitted around the pipe and causes the downstream seal (i.e. the one to the left in FIGS. 21*a*, 21*b*) to be actuated and lock the pig in this position, using the pressure of the water in the pipeline upstream of the pig for the actuation. At the same time, the receiver 101 causes an onboard hydraulic circuit (not shown in FIGS. 21*a*, 21*b*) to actuate the upstream seal with a small hydraulic cylinder (also not shown). In this way, the pig is effectively locked in place within the pipeline and a seal is formed to isolate the internal sections of pipe, upstream and downstream of the Pig.

The space between the end cap 43 and the pig can now be de-pressurised. A pressure sensor 102 onboard the pig in the space between the engagement devices provides a pressure reading which is received by the transmitter receiver collar 100, attached to the pipeline 6, and relayed to an external laptop computer (not shown). The pressure is monitored to establish whether a successful seal has been formed.

If the pressure remains constant, then the seal provided by the engagement devices has been successful. If the pressure decreases, then it can be deduced that the downstream seal is ineffective. If the pressure rises, it can be established that the upstream seal is ineffective. If either of the engagement devices has not seated correctly, then they will be de-actuated, using the onboard hydraulic circuit of the pig, and further attempts will be made to lock the pig in position to form an effective seal.

Once an effective seal has been established and the pipe downstream of the pig has been vented through the end cap, the end cap is removed such that the tie-in weld to the next pipeline section can be made.

After the weld has been successfully completed, the pig is unlocked by sending a signal from the pipe collar to de-actuate the engagement devices, and is pumped through to the location of the next tie-in weld, and the process is repeated.

Once the pipeline fabrication has been completed, the pig is recovered by pumping it into a pig receiver connected to the spool base end of the pipeline. If the onboard battery supply for the pig or the hydraulic system fails at any point, the pig is arranged so that it will failsafe to an isolation mode. The pig can then be removed from the pipeline by pressurising the downstream end of the pipeline, causing a suitable pressure differential to unseat the failsafe sealing mechanism, allowing the pig to be pumped downstream and removed from the line in a controlled manner.

According to a modification, a friction pig is used in place of the smart pig. As shown in the part-sectional, side view of FIG. 22, the friction pig 41' comprises a central elongate body 41'*a*, on each end of which is mounted an assembly of closely spaced disc seals 41'*b*. As in the case of the smart pig, these seals can be in the form of polyurethane discs. These discs act to guide the friction pig through the pipeline 6.

When a differential pressure between zero and a relatively small pressure, such as 4 bar, acts across the pig, the frictional engagement between the discs and the pipeline wall prevents the pig from moving; however, when the differential pressure acting exceeds this threshold amount (typically 4 bar), the frictional resistance is overcome and the pig is displaced within the pipeline 6. The threshold differential pressure is set at a value to resist the hydrostatic pressure due to the head of water in the pipeline from the highpoint where the pipeline passes up and over the chute/guide 14 (FIG. 1).

Essentially, the friction pig is used in the same way as the smart pig, described in detail with reference to FIGS. 1 to 19, and in particular the sequence of operating steps depicted in FIGS. 5 to 19, with the one difference that the pig is locked in position near the trailing end of the pipeline, to withstand the fluid pressure that is applied subsequently, by abutment against the trailing end cap 43, specifically in abutment against its buffer spring on the stand-off (both shown diagrammatically in FIG. 22) of the end cap 43. Thus, the end cap itself withstands the applied internal pressure, or substantially the whole pressure amount, rather than the tight frictional engagement with the pipeline wall in the case of the smart pig.

The invention claimed is:

1. A method for reeling a pipeline while extending the pipeline with an additional pipeline section, the pipeline having an inner corrosion-resistant metallic liner that is tightly fitted within the pipeline, wherein, to minimize or avoid wrinkling of the liner during the reeling, the method comprises the following steps:
   providing a fluid connection between the pipeline and pumping/pressurizing equipment via a manifold mounted on a flange of a pipe laying reel;
   internally pressurizing a length of the pipeline in a two-stage pressurizing process comprising:
   a first stage comprising filling the length of the pipeline with fluid, the fluid being delivered at a first pressure in the range of 5 to 25 bar absolute; and
   comprising further pressurizing the fluid to raise the fluid pressure from the first pressure to a second pressure of greater than 25 bar absolute;
   connecting a leading end of the pipeline to a reel via the manifold;
   reeling the length of the pipeline into the reel while pressurized to the second pressure;
   depressurizing the length of the pipeline; and
   joining a further pipeline section to a trailing end of the length of the pipeline.

2. The method according to claim 1, wherein a first pump is used for filing the length of the pipeline with fluid and thereby pressurizing it to the first pressure, and a second pump is used for raising the fluid pressure to the second pressure, wherein the second pump has a smaller volumetric delivery but a higher pressure than the first pump.

3. The method according to claim 1, wherein a pump of high volumetric delivery is used for filling the length of the pipeline with fluid and thereby pressurizing the pipeline to the first pressure and a pressure accumulator is used for raising the fluid pressure to the second pressure.

4. The method according to claim 1, wherein the second pressure is at least 30 bar absolute.

5. The method according to claim 1, wherein, after joining a further pipeline section to a trailing end of the length of the pipeline, there is a repetition of the two-stage pressurizing process and the reeling step for a length of the further pipeline section.

6. The method according to claim 1, wherein the first stage of the two-stage pressurizing process comprises:
   pumping a movable plug along the length of the pipeline towards the trailing end of the pipeline and
   locking the plug near the trailing end of the length of pipeline, so that the length is filled with fluid; and
   raising the pressure of the fluid from the first pressure to the second pressure.

7. The method according to claim 1, wherein the second pressure is more than 25 bar absolute and a multi-stage pump is used to internally pressurize the length of pipeline to the second pressure.

8. The method according to claim 7, wherein the pressurizing step comprises pumping a movable plug along the length of the pipeline towards the trailing end of the pipeline and locking the plug near the trailing end of the length of pipeline, so that the length is filled with fluid and the fluid pressure increases to more than 25 bar absolute.

9. The method according to claim 1, wherein the fluid is water.

10. A method for reeling or unreeling a pipeline having an inner corrosion-resistant metallic liner that is tightly fitted within the pipeline, wherein, to minimize or avoid wrinkling of the liner during the reeling or unreeling, the method comprises the following steps:
   providing a fluid connection between the pipeline and pumping/pressurizing equipment via a manifold mounted on a flange of a pipe laying reel;
   internally pressurizing a length of the pipeline in a two-stage pressurizing process, in the first stage of which the length of the pipeline is filled with fluid at a first elevated pressure and in the second stage of which the fluid pressure of the fluid filling the length of the pipeline is raised from the first elevated pressure to a second pressure that is greater than the first pressure; and
   unreeling the length of the pipeline while pressurized to the second pressure or connecting a leading end of the pipeline to a reel via the manifold and reeling the length of the pipeline while pressurized to the second pressure.

11. The method according to claim 10, wherein a first pump is used for filling the length of the pipeline with fluid at an elevated pressure and a second pump, having a smaller volumetric delivery than the first pump but a relatively higher delivery pressure, is used for raising the fluid pressure to the higher pressure.

12. The method according to claim 10, wherein a pump of high volumetric delivery is used for filling the length of the pipeline with fluid at an elevated pressure and a pressure accumulator is used for raising the fluid pressure to the higher pressure.

13. The method according to claim 10, wherein the elevated pressure has a value in the range 5 to 25 bar absolute and the higher pressure is greater than 25 bar absolute.

14. The method according to claim 13, wherein the higher pressure is at least 30 bar absolute.

15. The method according to claim 10 for reeling the pipeline, wherein, after the length of the pipeline has been reeled onto the reel, a further pipeline section is joined to a trailing end of the pipeline, followed by a repetition of the two-stage pressurizing process and the reeling or unreeling step for a length of the further pipeline section.

16. The method according to claim 10, wherein the first stage of the two-stage pressurizing process comprises:
   pumping a movable plug along the length of the pipeline towards the trailing end of the pipeline and locking the plug near the trailing end of the length of the pipeline, so that the length is filled with fluid, and
   raising the pressure of the fluid from the elevated pressure to the higher pressure.

17. The method according to claim 10, wherein the higher pressure is more than 25 bar absolute and a multi-stage pump is used to internally pressurize the length of pipeline to the higher pressure.

18. The method according to claim 17 for reeling the pipeline, wherein, after the length of the pipeline has been reeled onto the reel, a further pipeline section is joined to a trailing end of the pipeline, followed by a repetition of the pressurizing step and the reeling or unreeling step for the length of the further pipeline section.

19. The method according to claim 17, wherein the pressurizing step comprises pumping a movable plug along the length of the pipeline towards the trailing end of the pipeline and locking the plug near the trailing end of the length of pipeline, so that the length is filled with fluid and the fluid pressure increases to more than 25 bar absolute.

20. A method of pipe laying in which a pipeline is unreeled from a pipe laying reel on a pipe lay barge, the pipeline having an inner corrosion-resistant metallic liner closely fitted within an outer pipe that is less corrosion-resistant, and the pipeline being filled with an internal fluid pressurized to a first absolute pressure of 5 to 25 bar, the method comprising the operations of:
- providing a fluid connection between the pipeline and pumping/pressurizing equipment via a manifold mounted on a flange of the pipe laying reel;
- pressurizing the pipeline by raising the pressure of the internal fluid filling the pipeline from the first absolute pressure to a second absolute pressure of at least 25 bar;
- unwinding the pipeline from the reel while the absolute pressure of at least 25 bar is maintained in the pipeline;
- laying the pipeline on the seabed; and
- depressurizing the pipeline.

21. The method according to claim 20 in which the pressurizing operation is performed by firstly operating a pumping system to fill the length of pipeline with fluid at a first absolute pressure below 25 bar and thereafter raising the pressure to a second absolute pressure of at least 30 bar.

22. The method according to claim 20 in which the absolute pressure in the pipeline is maintained at a level of at least 30 bar by connecting an accumulator to the pipeline during the unwinding operation.

23. The method according to claim 22 in which the accumulator is mounted on the pipe laying reel.

24. The method according to claim 20, wherein the fluid is water.

* * * * *